US009275199B2

(12) United States Patent
De Laat et al.

(10) Patent No.: US 9,275,199 B2
(45) Date of Patent: Mar. 1, 2016

(54) METHOD AND SYSTEM FOR DETECTING VIOLATION OF INTELLECTUAL PROPERTY RIGHTS OF A DIGITAL FILE

(75) Inventors: Dennis De Laat, Hilversum (NL); Marc De Laat, Amsterdam (NL)

(73) Assignee: Link-Busters IP B.V., Amsterdam (NL)

( * ) Notice: Subject to any disclaimer, the term of this patent is extended or adjusted under 35 U.S.C. 154(b) by 0 days.

(21) Appl. No.: 13/533,866

(22) Filed: Jun. 26, 2012

(65) Prior Publication Data

US 2013/0007890 A1   Jan. 3, 2013

Related U.S. Application Data (60) Provisional application No. 61/502,168, filed on Jun. 28, 2011.

(51) Int. Cl.
H04L 29/06 (2006.01)
G06F 21/10 (2013.01)

(52) U.S. Cl.
CPC ........ G06F 21/10 (2013.01); *G06F 2221/0722* (2013.01)

(58) Field of Classification Search
CPC ......... G06F 21/10; G06F 21/16; G06F 21/85; H04N 21/8358; H04N 21/4627; H04N 21/4122; H04N 21/2543; H04N 21/2541; H04N 21/6125
USPC ................ 726/26; 713/176; 380/201; 725/87
See application file for complete search history.

(56) References Cited

U.S. PATENT DOCUMENTS

| 8,601,503 | B2 * | 12/2013 | Li et al. ........................... 725/9 |
| 2002/0168082 | A1 | 11/2002 | Razdan |
| 2004/0010692 | A1 * | 1/2004 | Watson ......................... 713/176 |
| 2007/0033146 | A1 * | 2/2007 | Hollar ............................. 705/57 |
| 2008/0256647 | A1 * | 10/2008 | Kim et al. ........................ 726/32 |
| 2008/0301452 | A1 * | 12/2008 | Horne et al. .................. 713/176 |
| 2010/0268958 | A1 * | 10/2010 | Horne et al. .................. 713/176 |
| 2010/0296649 | A1 * | 11/2010 | Katzenbeisser et al. ......... 380/28 |
| 2011/0145935 | A1 * | 6/2011 | Adams et al. ................... 726/30 |

FOREIGN PATENT DOCUMENTS

| EP | 1130492 A2 * | 9/2001 | ................ G06F 1/00 |
| EP | 2071822 | 6/2009 | |

(Continued)

OTHER PUBLICATIONS

Nederland International Search Report Application No. NL 2006658, Oct. 18, 2011, 4 pages.
Nederland International Written Opinion Application No. NL2006658, Apr. 22, 2011, 4 pages.

(Continued)

*Primary Examiner* — Hadi Armouche
*Assistant Examiner* — Hee Song
(74) *Attorney, Agent, or Firm* — Rothwell, Figg, Ernst & Manbeck, PC (57) ABSTRACT

A computer-based method and system for detecting violation of intellectual property rights of a digital file, comprising, in a distribution channel, digitally sending or streaming the file from a sending party to a receiving party, adding a watermark to the digital file at the sending party prior to sending or streaming the file, wherein the watermark comprises an identifier of the sending and receiving party(s), as well as a unique file ID. In one embodiment, the party is informed about user and/or customer behavior, and can take precautions.

8 Claims, 4 Drawing Sheets

(56) References Cited

FOREIGN PATENT DOCUMENTS

| GB | 2358313 A | 7/2001 |
| WO | WO 2004/006494 A1 | 1/2004 |
| WO | WO 2004/038531 A2 | 5/2004 |
| WO | 2009031082 A1 | 3/2009 |
| WO | WO 2009/027902 A2 | 3/2009 |
| WO | 2010081931 A1 | 7/2010 |

OTHER PUBLICATIONS

International Search Report and Written Opinion issued in PCT/IB2012/001276 dated Oct. 8, 2012, 12 pages.

Harris et al., "Root Pruning Pin Oak Liners Affects Growth and Root Morphology", 4 pages.

Sheppard et al., "On Multiple Watermarking", ACP Multimedia and Security, ISBN: 978-1-58113-393-6, Oct. 5, 2001. pp. 3-6.

* cited by examiner

METHOD AND SYSTEM FOR DETECTING VIOLATION OF INTELLECTUAL PROPERTY RIGHTS OF A DIGITAL FILE

CROSS-REFERENCE TO RELATED APPLICATIONS

The present application claims priority benefit under 35 U.S.C. §119(c) of U.S. Provisional Application No. 61/502,168, entitled "Method and System for Detecting Violation of Intellectual Property Rights of a Digital File," filed Jun. 28, 2011, the contents of which are incorporated herein by reference in their entirety.

The present invention relates to a computer-based method and system for detecting and halting violation of intellectual property rights of a digital file or work.

BACKGROUND

Digital files can comprise documents such as books, music, images or video recordings, games or parts thereof, data, or other works that are subject to intellectual property rights, such as copyrights. In terms of copyright property rights, such files are often referred to as "works". The digital format makes it easy to copy and distribute files, to send them via email, to distribute them via peer-to-peer networks, or to make them available for download on the Internet. In some cases, intellectual property royalties are paid to the owner of the file; but in many cases, such payments are not made. Files and the corresponding works are then distributed for free; and for the owner of the file, it is very difficult to find out where the work was initially "leaked". Once the file is made available to the public, it is almost impossible to stop further distribution of the file, and it is also impossible to trace its origin.

Attempts have been made to stop illegal distributing (in particular downloading) of files. Besides regulations that forbid copying and/or content downloading and/or sharing, encoding techniques have been used that allow only users who have paid for the rights to use the content of a specific digital file to make use of that file. Digital rights management (DRM) and watermarking techniques are examples thereof.

The existing techniques alone however have not proven to be effective. End-users appear to be very inventive in finding techniques to decode encrypted files or to break DRM protection. Moreover, some damage, like the leaking of unreleased material, like films, books or music albums, cannot be undone.

It is therefore a goal of the present invention to find a method and system for preventing violation of intellectual property rights of a digital file, that overcomes the disadvantages of the prior art, and/or enables an effective detection and/or prevention of intellectual property abuse.

SUMMARY

Exemplary embodiments are directed to a computer-implemented method for detecting violation of intellectual property rights of a digital file, including, in a distribution channel, digitally sending the file from a sending party to a receiving party; adding a watermark to the digital file at the sending party prior to sending the file while sending, streaming, playing, or viewing the file; wherein the watermark comprises at least an identifier of the receiving party. A party can include a user, person, persons, an entity, entities, websites, and the like—each capable of sending and/or receiving a file.

Alternate embodiments provide a system for preventing violation of intellectual property rights of a digital file, including means for adding a watermark to the digital file at a sending party prior to sending, streaming, playing the file, wherein the watermark comprises at least an identifier of the receiving party.

An additional embodiment is also directed to a system for detecting violation of digital media property rights, including a processor configured to add a watermark to a digital media; a database for storing watermarks to be added to digital media; a communications network for transmitting the digital media from an originating party to a receiving party; a software application for determining whether the receiving party is authorized to receive the digital media; and a communications device or medium for notifying a user that the property rights of a digital media have been violated.

A further embodiment is directed to a computer-readable medium encoded with computer-executable instructions, which, when executed by a computer, provide for the detection of the violation of intellectual property rights of a digital file, wherein the instructions are provided for adding a watermark to a digital file at a sending party prior to distributing the digital file; storing, onto a database, the added watermark; transmitting the watermarked digital file from the sending party to a receiving party, wherein the watermark comprises at least an identifier of the receiving party; searching the watermark database for occurrences of unauthorized distribution of the digital file; for each occurrence of unauthorized distribution of the digital file, identifying the last authorized recipient of the digital file in the distribution stream; identifying one or more likely unauthorized distributors of the digital file; and implementing measures to stop the unauthorized distribution of the digital file. Such measures can include notification of the owner of the digital file, closing distribution channels to the one or more likely unauthorized distributors, imposing financial costs on the one or more likely unauthorized distributors, and notification to the one or more likely unauthorized distributors.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements, parties are occasionally designated instances, and.

DETAILED DESCRIPTION OF THE EMBODIMENTS

Figure 4:
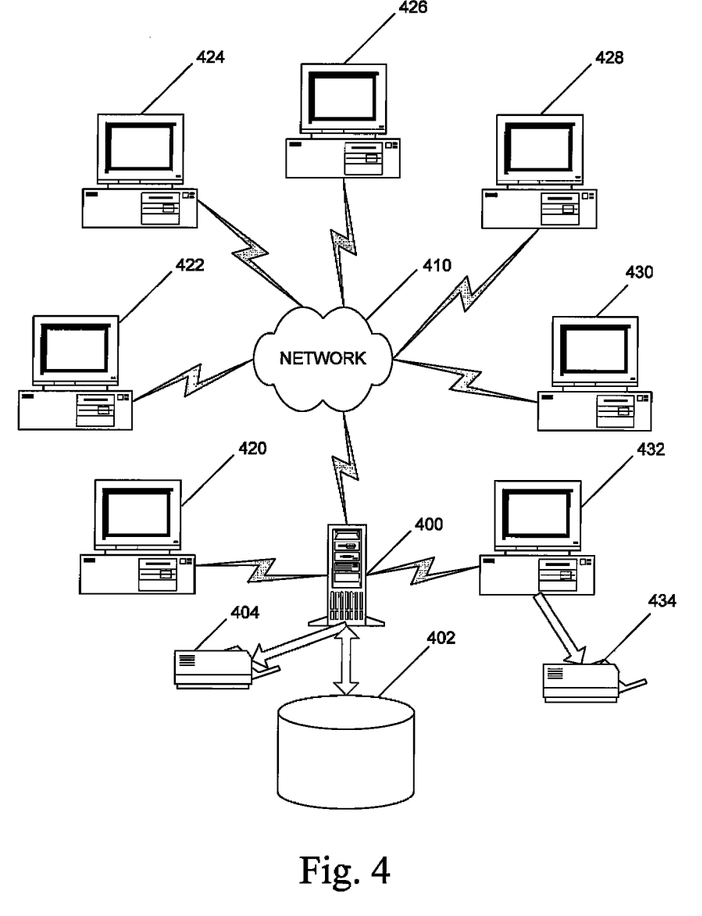
FIG. 4 shows a component diagram of a computer-based system for watermarking digital files and for detecting violation of intellectual property rights of a digital file.

Referring initially to FIG. 4, there is illustrated a computer-based system for watermarking digital files and for detecting violation of intellectual property rights of a digital file. While exemplary embodiments are described below for detecting violation of intellectual property rights, the method and system of the invention are not so limited. Embodiments of the invention can be easily extended by persons of skill in the art, in conjunction with the present description of the invention, to the adding of watermarks to digital files; to detecting illegal or unauthorized use, copying, or distribution of digital files; and to preventing illegal or unauthorized use, copying, or distribution of digital files.

These and other aspects of the violation detection method and system will now be described in greater detail in connection with a number of exemplary embodiments. To facilitate an understanding of the embodiments, many aspects are described in terms of sequences of actions to be performed by elements of a computer system or apparatus as shown in FIG. 4. It will be recognized that in each of the embodiments, the various actions could be performed by specialized circuits, by computer program or computer product instructions being executed by one or more processors, or by a combination of both. Moreover, embodiments can additionally be considered to be embodied entirely within any form of computer readable storage medium having stored therein an appropriate set of computer instructions that would cause a processor to carry out the techniques, methods, and steps described herein.

FIG. 4 shows a central computer 400 of the violation detection system connected across a network 410 to one or more terminals 420-432. While six terminals are shown, any number of terminals can be connected to the central computer 400. Further, while an exemplary embodiment considers the terminals communicating with the central computer 400 across a network 410, any number of known communications systems, including hard-wired connections, local wireless networks, intranets, and the Internet, can be used to provide communications and the flow of information between the central computer 400 and one or more terminals 420-432 and between individual terminals 420-432 without detracting from exemplary embodiments. While the central computer 400 is shown as originating the digital file for distribution, any of the terminals can originate a digital file with intellectual property rights to be protected.

Each of the computers 400 and 420-432 have one or more processors for the processing of software instructions, for processing input information, for analyzing information, for automatically making decisions, and for creating output information. The exemplary computers 400 and 420-432 are not limited to traditional desk-top computers or laptop computers. Processing, communicating, and data transmitting and receiving functions can be implemented in a number of electronic devices within embodiments covered by the present concepts. For example and not limitation, one or more of the exemplary computers can comprise cellular telephones and/or personal digital assistants, including blackberry-type devices; and the computer users communicate through the computers using known electronic user interfaces.

Computer-executable instructions, or software, are provided for directing the processing of the computers 400 and 420-432, including processing the steps of exemplary embodiments of the violation detection system. The computer-executable instructions, when executed by the computers 400 and 420-432 and/or the processors associated with each of said computers, provide for the addition of watermarks to the digital files; the detection of unauthorized use, copying, or distribution of the digital files; the reporting of detected violations; and implementation of steps to prevent further violations. One or more storage devices 402 are provided for storage of information, watermarks, software, and/or plugins utilized in the violation detection and prevention system. While FIG. 4 shows the storage device 400 connected, by hard connection or wirelessly, to the computer 400, exemplary embodiments are not so limited; and one or more storage devices can be used, connected variously to one or more computers 422-432 or via a cloud network 410, which can also be the Internet. The software can be stored on the storage devices, can be loaded into the memory of the computers, or can be stored onto separate storage means within the computers. Further, the software can comprise separate programs and sets of instructions or can be combined into a single program, set of instructions, or program module.

Means for supporting a computer-based system for detecting violation of intellectual property rights include the computers 400 and 420-432 and their respective processors and storage devices, along with the software, or computer instructions, for directing the computers and/or processors to process the steps, detection, analysis, and communication for the violation detection system. In addition, communication devices and networks are means for notifying a central computer 400, senders, carriers, and recipients with information regarding the detected violation of intellectual property rights and the prevention of further violations. Information and records associated with the detection and prevention of violation of intellectual property rights can be recorded on the storage devices 402, displayed on the screens of the computers 400 and 420-432, and output, such as on the exemplary printers 404 and 434.

An exemplary embodiment includes a method for detecting violation of intellectual property rights of a digital file, comprising, the steps of (A) in a distribution channel of the digital file, digitally (dis)playing, streaming, (pre-)viewing, and/or downloading the file from a sending or streaming party to a receiving party, (B) adding a watermark to the digital file at the sending party prior to sending/broadcasting the file, wherein (C) the watermark comprises at least an identifier of the receiving party.

The distribution channel for a digital file can include, for example, network facilities and pathways for accessing, viewing, downloading, sending, and streaming electronic files. The distribution channel for a book, for example, can be from an author, via a publisher, via one or more online bookstores, to multiple end-users. For an audio recording, the distribution path can lead from a producer, via a record company, via an online shop, to an end user. For a film, the path can lead from a movie company to cinemas, and parallel to DVD-producers and to end-users. Very often films leak to the public before their official premiere.

The technique of digitally watermarking, i.e., labeling or identifying, digital files is well known. Watermarks in exemplary embodiments can be added in such manner that they are not (dis)played when the file is used, but can still be detected with a dedicated tool. The watermark, for example and not limitation, can be placed in a data-section of the file, or in a META section, and can be configured such that it remains detectable, even after conversion or other modification of the file. Watermarks as utilized herein can comprise any electronic manner of marking or identifying a digital file, including the addition of one or more of a file identifier, an identifier of the receiving party, and an identifier of the sending party.

The method according to an exemplary embodiment thus provides an anti-piracy solution that makes fingerprint/watermark technology applicable within Internet surveillance. The embodiment offers the possibility to encode watermarking at different stages, in a matter that identifies each stage in the distribution process. When a file is offered illegally, it enables the intellectual property holder, distributor and/or reseller to exclude the identified recipient to receive files in the future or take other measures. This is an advantage over DRM systems according to the art, which only offer protection to a certain stage in the distribution process. In contrast to DRM, the purchased content can be legally played or viewed on any device. When the content is illegally shared, the identity of the last receiving party can be determined.

In a preferred embodiment, the method comprises (D) iteratively repeating steps B and C for subsequent sending and receiving parties in the distribution channel. Therefore, when detecting an alleged illegally distributed digital file, the party that last received it intentionally or legally can be determined, and the possible leaking source can be found.

Iteratively adding watermarks to a digital file can cause difficulties in retrieving the watermark, or can even deteriorate the file in such way that the watermark creates visible or audible artifacts. To avoid these problems, in an embodiment, the method according to the invention comprises removing a prior watermark by the sending or streaming party through a plugin/web application hosted by the intellectual property right holder or an authorized agent.

To be able to recognise a watermarked file later on, as a first step, a digital file can be marked with a unique ID.

In yet another embodiment, subsequently added watermarks are laid over a not yet watermarked part of the digital file. This requires specific watermarking methods. In case of an audio file, the file can be divided into parts corresponding with a certain playback time. This can, for example, be done by dividing the file length into an amount of intervals higher than the expected number of parties in the distribution channel. Each subsequent party then places a watermark in the first free interval. A disadvantage of this method however is that the watermarks disappear when the file is cut for some reason.

Another option, that provides a solution for this problem, is to divide the file length in intervals of one second or, for example, five seconds of playback time; and to divide these intervals into timeslots of several milliseconds, wherein a specific party adds or superimposes or stamps the watermark to a certain timeslot in each interval.

An analogous technique could be applied to a document or book, wherein the intervals do not correspond with a predetermined amount of time, but rather to a predetermined number of mutations; for example, synonyms and/or abbreviations to create a binary code. Examples are replacing "you're" with "you are" or "is not" with "isn't", adding code to whitespaces, interchanging synonyms and/or personalizing the book.

To be able to determine the level or step in the distribution channel the digital file was leaked, or illegally distributed, the identifier can comprise an indication of a level/stage in the distribution channel. For example, specific indicators for a "source", a "producer", a "webshop", or a "streaming platform" (such as Facebook™, You Tube™, SoundCloud™, or Spotify™) and "end user" can be used. After analyzing a leaked file, it can be determined at where in the distribution channel further protection is necessary.

More specific detection can take place when the identifier is chosen to be a more targeted identifier. In this case, the exact party that has last received the file can be determined, and precautions can be taken against the party coupled to the specific party. For example, the identifier can comprise the IP address, a MAC or IMEA address, or customer information such as user ID, login credentials, or a credit card number of the receiving party. IP addresses are unique numbers, and they are registered with internet providers. For mobile media playing devices (telephones, PDA's, laptops and readers), device-specific codes can be used.

However, a central database of a system according to exemplary embodiments does not necessarily need to store end-user information. It can store a unique code for every station in the distribution channel. During sales, and/or distribution and/or streaming, codes are added or (re)placed. Herein, multiple codes can be combined as a single code, for example with a common checksum. This way, the system is only required to store the codes. If abuse or illegal copying or distribution is determined, the system can provide, for example, a webshop with the ID of its end user, so that the webshop can take action/precautions. The codes can be chosen such that the entire distribution channel can be traced, or only a last end-user who has leaked the file.

Watermarking the digital file is preferably performed real-time near or at the moment of streaming, (pre-)viewing, reading, playing, or buying the file. An application can be provided that accepts a file for watermarking and that adds a unique identifier. The application can be stand-alone, an applet, a software module, or a web application/service. In another embodiment, a plugin/API is provided to websites for incorporation thereon. Parties in the distribution chain can register and have a unique copy of such an application, or log on to a central web or server application which then authenticates the party and adds a (unique) watermark.

The method according to exemplary embodiments can further comprise the step of searching the network, such as the Internet, for content infringing intellectual property rights. Various techniques to trace illegal content, i.e. content for which intellectual property rights are infringed, can be applied. For example, peer-to-peer networks and file-sharing applications and websites can be searched. When illegal content is found, it is scanned for the presence of a watermark, and if a watermark is detected, the party that has last legally received, and apparently has leaked the content is determined, and where applicable, contacted, or other actions, precautions, and/or notifications are taken, such as (temporary) exclusion from a website or a community.

According to an embodiment of the invention, no end users are contacted directly, but the last issuing party (i.e. a website, or webshop, or any streaming party) is contacted. Such party can know the identity of the user, and can take further precautions, such as a warning, a fee, or an exclusion from a website or service, or even legal action. Preferably, the party is enabled to identify and contact the user. If the user makes use of the website, webshop, or service anonymously, an IP address, or in case of the use of certain (mobile) media devices, a MAC or IMEA code can be registered.

Examples of parties for which the method and system according to the invention can be applicable are, for example, file hosting sites, such as Zippyshare, Megaupload, and Rapidshare; streaming sites, such as YouTube.com, SoundCloud.com, and Vimeo.com; and peer to peer sharing sites and communities, such as torrents, usenet; and file sharing software, such as Kazaa and Limewire. Content can further be distributed via social networks such as Facebook, Hyves, etc.

Various coding techniques can be applied. Table 1 below gives a non-exclusive overview of possible digital data and types of watermarks that can be applied.

TABLE 1

| Media Item | Type of Digital File | Exemplary Watermark |
|---|---|---|
| 1 | Music | (Audio Watermark) |
| 2 | Text/Books | (Text Encoding + Personalization) |
| 3 | Video | (Audio and Picture Watermark) |
| 4 | Pictures | (Picture Watermark) |
| 5 | Software/Games | (Audio and Picture and Metadata Watermark) |

Table 2 below gives an overview of the stations where one or more watermarks can be added and parties that can encode or be encoded in the watermark. According to exemplary embodiments, watermarks can be added in one or more of these stages. However, it is preferred that a stage wherein the digital media is delivered to an end user is at least watermarked, so that the end user of a shop etc. can be determined, and precautions can be taken.

TABLE 2

| Step | Step Where Watermark is Added | Watermark-Encoding Party |
| --- | --- | --- |
| A | Intellectual Property Holder | (Artist/Author/Company) |
| B | Testing/Pre Viewing | (Alpha/Beta Testers) |
| C | (Post-) Production Company | (Mastering Studio/Digital Publisher) |
| D | Promotion | (Press) |
| E | Distribution | (Partners) |
| F | Performance | (Live Performance, (Online Viewing), Premiere) |
| G | Release General Public | (Shop, Cinema, Internet Transmission/Download) |

Figure 1:
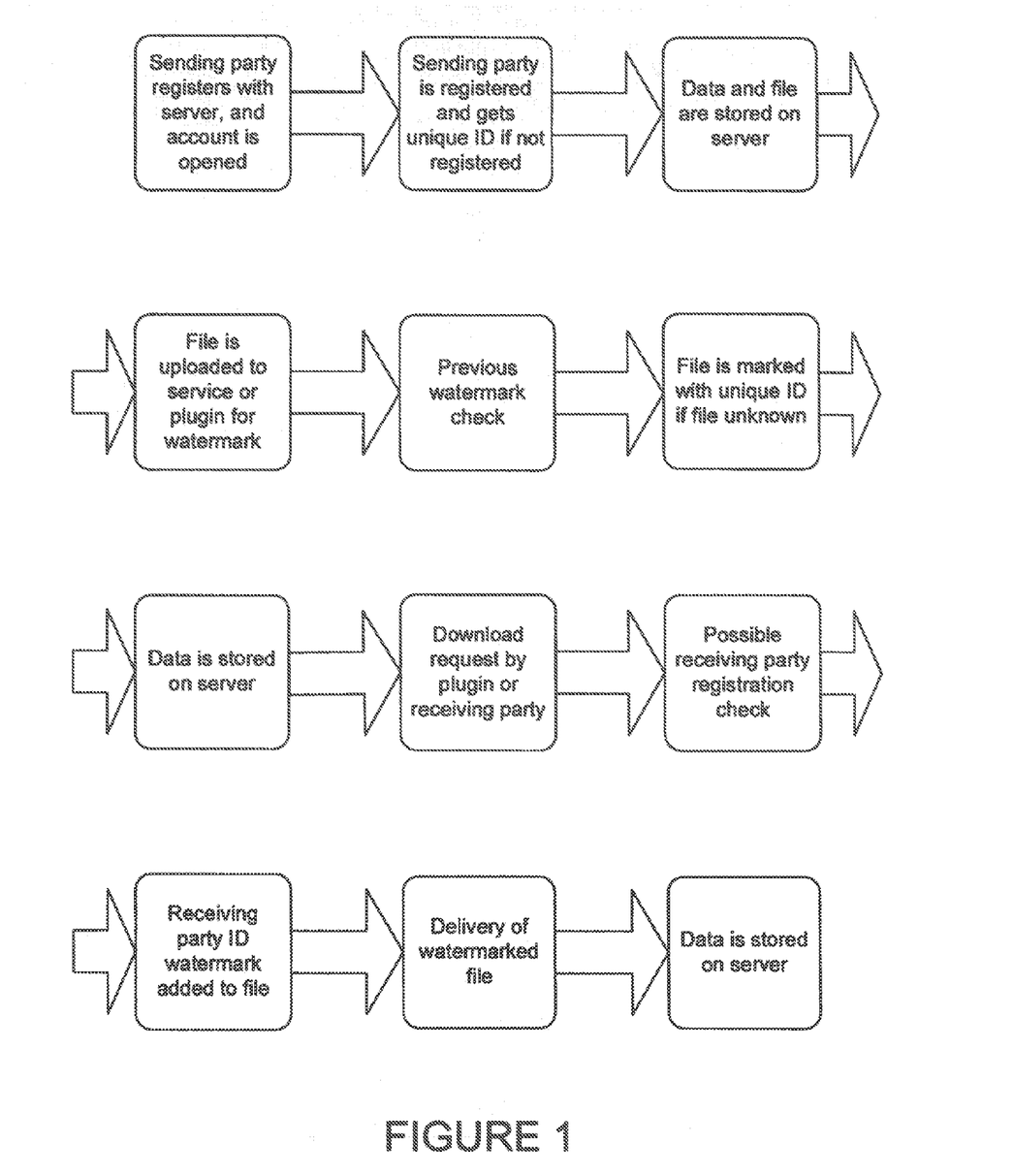
FIG. 1 shows a block flow chart of a method for adding one or more watermarks to a digital file.

FIG. 1 shows steps of a method for adding a watermark to a digital file, optionally using an application or a plugin for a website. The method comprises a first step of registering an party at a central server application. After registering, as a second step, a pre-personalised application is supplied to the party. The application can, for example, be downloadable, sent by e-mail, or distributed by other known means. The application can provide the details of the party, that can be used when watermarking a digital file. In another embodiment, a generic application can be made available, wherein the party fills out details for enabling the application to add specific watermarks to files.

A third step edits a file with the application, which can take place by dragging and dropping the file to the application. The application can require information on the destination of the file. Upon dropping the file, as a fourth step, the application can contact a central database, that authenticates the party, and can require further information. If the party cannot be authenticated, as a fifth step, further information can be required, and a digital form can be presented. In that case, as a sixth step, registration can take place. When adding the watermark to the file, an amount is deducted from a credit of the party, as a seventh step. Next, as step eight, the watermarked file is output to a "processed files" folder. A ninth and last step is then to send the file to a receiving party. Besides an application, a plugin can be used as well.

Figure 2:
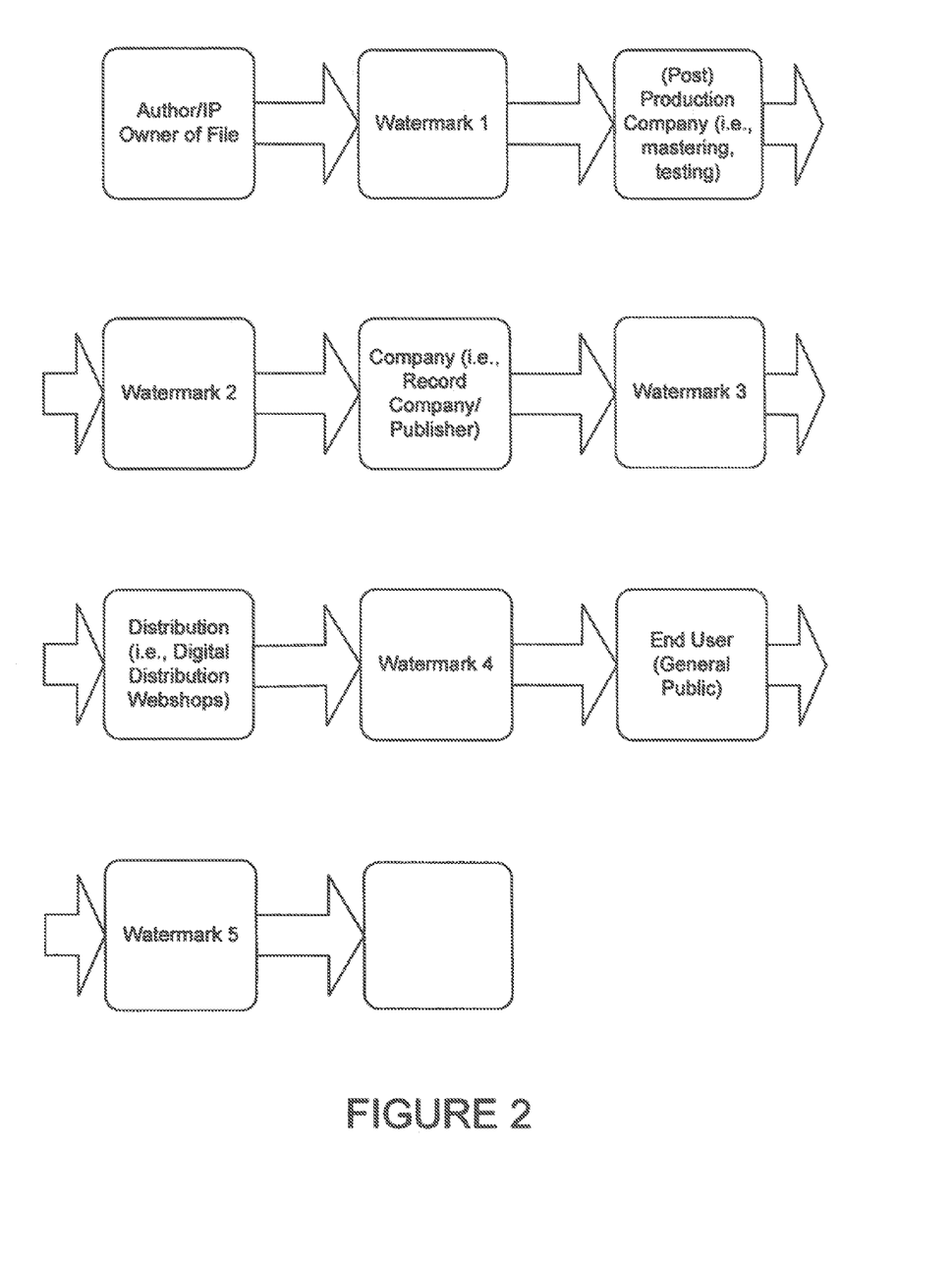
FIG. 2 shows a block flow chart of a method for subsequently adding watermarks to a digital file during a distribution process according to exemplary embodiments.

FIG. 2 shows a flowchart for watermarking digital files in a distribution channel according to exemplary embodiments. As a first step, a producer of an audio recording, for example, retrieves the application as described with reference to FIG. 1. As a next step, a digital music file is provided with a watermark by an application used by the producer. The producer indicates the destination of the file, in this case, a record company. Then, the file is sent to a record company. The record company performs the same steps: it receives the file, provides it with a watermark by adding the latter with their own copy of the application, and sends it to a next receiving party, in the example given, a mastering studio. From this studio, the file is, for example, forwarded to internet shops, and then on to an end user, wherein at each level in the distribution channel corresponding steps are performed. For that purpose, the central server application can distinguish various different party types, and issue specific watermarks, for example for producers, masters, record companies, (web) shops, promotionals, portals, remixers, and websites like Youtube and Soundcloud (media streaming websites).

Figure 3:
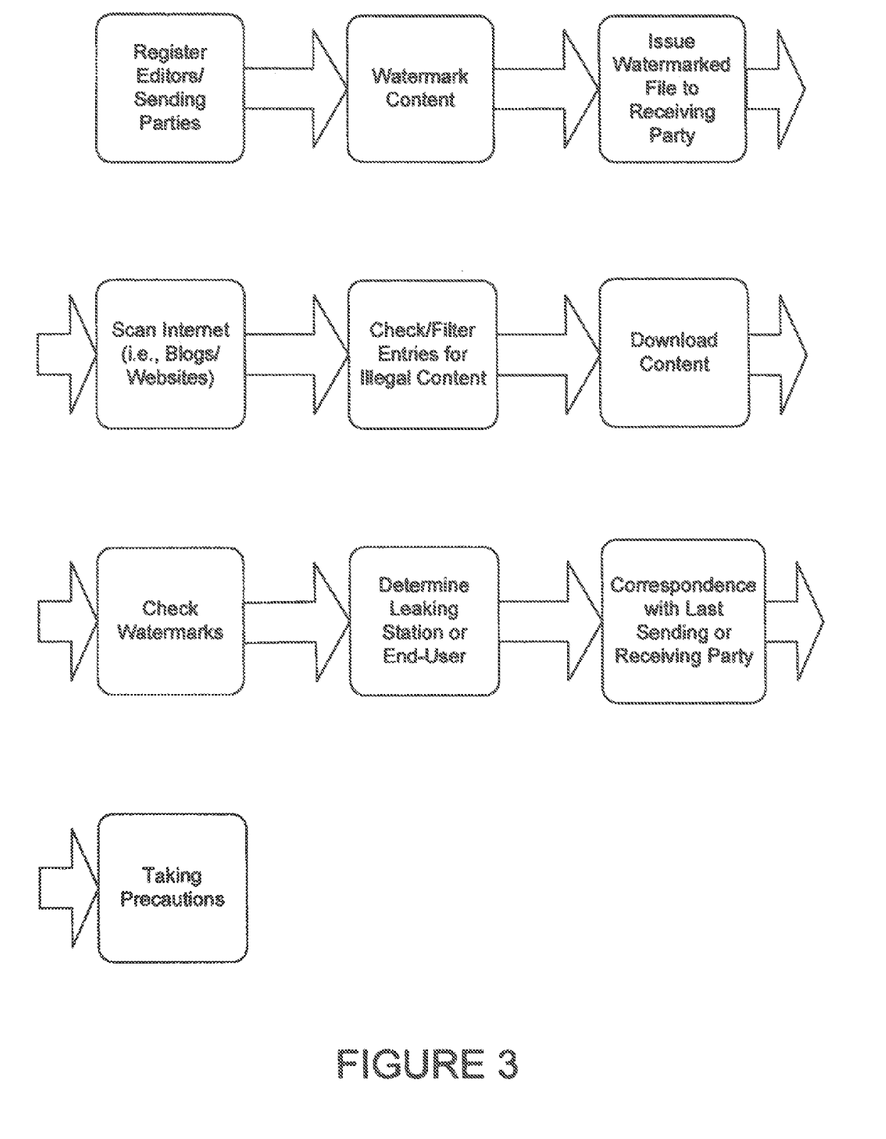
FIG. 3 shows a block flow chart of a method for tracing a watermarked digital file according to exemplary embodiments.

FIG. 3 shows a method for tracing a watermarked digital file according to exemplary embodiments. First, editors in the distribution channel register at the central server. Then, content, in the form of a digital file, is sent to an end user or client. A next step is to collect content from various internet sources, such as websites, file sharing networks and blogs, and to filter new entries for registered titles to be monitored. When found, the content is downloaded, and checked for watermarks. If these watermarks are found, details of the watermark are collected, and the last issuing party is contacted. A predetermined or suitable action or precaution is then taken; for example, the user account is blocked or deleted, or in certain cases his/her credit card can be charged.

In addition to the above described methods, exemplary embodiments include a system for preventing violation of intellectual property rights of a digital file, comprising: means for adding a watermark to the digital file at a sending party prior to sending the file, wherein the watermark comprises an identifier of the sending party. The system can be configured for removing a previously added watermark, or adding a watermark in a part of a digital file where no watermark was available yet. The system can further comprise local applications, each configured to run in the distribution channel of the digital file, wherein the local applications are further configured for communication with a central server application. The system can be implemented in various ways, such as an application, a plugin, a webservice, etc.

Although preferred embodiments of the present invention have been shown and described, it will be appreciated by those skilled in the art that changes can be made in these embodiments without departing from the principle and spirit of the invention, the scope of which is defined in the appended claims and their equivalents.

What is claimed is:

1. A computer-implemented method for detecting violation of intellectual property rights of a digital file, comprising:
   in a distribution channel, digitally sending a digital file from a sending party to a receiving party; and
   adding a watermark to the digital file at the sending party prior to sending, streaming, playing, or viewing the file;
   repeating the sending and adding steps for subsequent sending and receiving parties in the distribution channel, wherein the identities of the subsequent sending and receiving parties are added to the watermark;
   searching a network for content infringing intellectual property rights of the digital file;
   scanning the infringing content for watermarks;
   when a watermark is found, determining the party in the distribution channel that has last legally received the content;
   identifying one or more likely unauthorized senders of the digital file;
   taking precautions or actions against a party that has leaked or offered the illegal content; and
   notifying a user that the property rights of the digital file have been violated,
   wherein the watermark comprises an identifier that identifies the receiving party; and
   wherein the watermark identifier further comprises an identifier that identifies one or more of the sending party and the digital file.

2. The method according to claim 1, comprising:
   as a first step in the method, marking the digital file with a unique ID.

3. The method according to claim 1, wherein a sending party removes a prior watermark.

4. The method according to claim 1, wherein subsequently added watermarks are laid over a non-watermarked part of the digital file.

5. The method according to claim 1, wherein the identifier comprises an indication of a level in the distribution channel.

6. The method according to claim 1, wherein the identifier is a unique identifier.

7. The method according to claim 1, wherein the identifier comprises one or more of the IP address, the user ID, the MAC address, and the IMEA address of the receiving party.

8. The method according to claim 1, wherein the watermarking is performed real-time.

* * * * *